(12) United States Patent
Andrews

(10) Patent No.: US 7,204,788 B2
(45) Date of Patent: Apr. 17, 2007

(54) PEDAL STROKE ADJUSTER FOR BICYCLES OR THE LIKE

(76) Inventor: Ronald A. Andrews, 975 Santa Barbara Rd., Berkeley, CA (US) 94707

( * ) Notice: Subject to any disclaimer, the term of this patent is extended or adjusted under 35 U.S.C. 154(b) by 384 days.

(21) Appl. No.: 10/897,549

(22) Filed: Jul. 23, 2004

(65) Prior Publication Data

US 2005/0020411 A1    Jan. 27, 2005

Related U.S. Application Data

(60) Provisional application No. 60/490,095, filed on Jul. 25, 2003.

(51) Int. Cl.
*A63B 22/06*   (2006.01)
*G05G 1/00*   (2006.01)

(52) U.S. Cl. .......................... 482/57; 74/546

(58) Field of Classification Search ................ 482/57, 482/908; 280/255, 256, 259, 274; 403/104; 74/594.1, 600, 594.3, 546, 594.4, 586, 594.7, 74/562

See application file for complete search history.

(56) References Cited

U.S. PATENT DOCUMENTS

| | | | | |
|---|---|---|---|---|
| 385,717 A | * | 7/1888 | Kibbe | 74/594.1 |
| 823,712 A | * | 6/1906 | Uhlmann | 74/594.1 |
| 3,888,136 A | * | 6/1975 | Lapeyre | 74/594.1 |
| 3,922,929 A | * | 12/1975 | Marchello | 74/562 |
| 3,945,135 A | * | 3/1976 | Hanson et al. | 36/117.8 |
| 4,019,230 A | * | 4/1977 | Pollard | 280/214 |
| 4,606,241 A | | 8/1986 | Fredriksson | |
| 4,648,287 A | | 3/1987 | Preskitt | |
| 4,850,245 A | | 7/1989 | Feamster et al. | |
| 4,915,374 A | * | 4/1990 | Watkins | 482/57 |
| 5,161,430 A | | 11/1992 | Febey | |
| 5,338,272 A | * | 8/1994 | Sweeney, III | 482/57 |
| 5,458,022 A | | 10/1995 | Mattfeld et al. | |
| 5,566,589 A | | 10/1996 | Buck | |
| 6,589,139 B1 | * | 7/2003 | Butterworth | 482/57 |

* cited by examiner

*Primary Examiner*—Lori Amerson
*Assistant Examiner*—Tam Nguyen
(74) *Attorney, Agent, or Firm*—Harris Zimmerman

(57) ABSTRACT

A stroke adjusting attachment for bicycles or the like enables selective changing of the diameter of the orbit which is traveled by a foot pedal to adapt a particular bicycle to persons having different leg lengths or who may have physical impairments which limit foot movement. The pedal is fastened to the attachment rather than being directly secured to a crank arm of the bicycle in the conventional manner. A track member is secured to the bicycle crank arm and the pedal is fastened to a slider which is travelable to any of a plurality of different locations along the track member. Blades extend from the track member adjacent to opposite surfaces of the crank arm thereby maintaining the attachment in a fixed orientation relative to the crank arm. A particular attachment of this form can be fitted onto a variety of crank arms of different sizes and shapes.

7 Claims, 4 Drawing Sheets

PEDAL STROKE ADJUSTER FOR BICYCLES OR THE LIKE

CROSS-REFERENCE TO RELATED APPLICATION

This application claims subject matter disclosed in U.S. Provisional Application No. 60/490,095 entitled "Bicycle Pedal Stroke Adjusting Mechanism" and which was filed on Jul. 25, 2003 by Roland A. Andrews.

STATEMENT REGARDING FEDERALLY SPONSORED RESEARCH OR DEVELOPMENT (Not Applicable)

BACKGROUND OF THE INVENTION

This invention relates to bicycles or similar devices which are operated by manual turning of foot pedals in circular orbits. More particularly the invention relates to stroke adjuster attachments for selectively changing the diameter of the orbits which are traveled by the pedals in devices of this type.

The foot pedals of a bicycle or the like are mounted on two crank arms that extend in opposite radial directions from the rotary axis of a drive sprocket. In a conventional bicycle the crank arms are of equal length and the pedals are situated at the ends of the crank arms. Thus, in an unmodified conventional bicycle, both pedals must be traveled around orbits that are of equal diameter and which are of fixed size. This can cause significant problems for many bicyclists.

Smaller persons may have difficulty operating a bicycle having a pedal orbit that is proportioned for an adult of average size or, in extreme cases, may find that to be impossible. Operation of the same bicycle by persons who have unusually long legs may be uncomfortable. Other persons may have physical impediments that limit foot movement to a pedal orbit that is smaller than would normally be appropriate. In some cases only one foot may be subject to the impediment. In those cases, the orbit of one pedal should differ from the orbit of the other.

This problem has heretofore been addressed by a variety of stroke adjuster mechanisms which enable selective changing of the distance between a foot pedal and the rotary axis of the drive sprocket which the pedal turns. The pedal is detached from the bicycle crank arm and is reattached to a slidable member which can be positioned at any of a plurality of locations along the crank arm. Use of stroke adjusters of this kind as heretofore configured has been undesirably complicated as bicycle crank arms do not have a single standardized shape. Different crank arms have different sizes and configurations. This is most notably the case in the region of the crank arm which is closest to the rotary axis of the sprocket gear to which the crank arm is attached. Crank arms may have various different curvatures and configurations in that region.

Consequently, components of prior stroke adjusters which fasten the attachment to a crank arm are designed for use with a crank arm of a specific shape and in many cases are not easily attachable to crank arms having other configurations. Use of stroke adjusters would be facilitated and become more practical if the adjusters were compatible with diverse crank arms having a variety of different sizes and shapes.

The present invention is directed to overcoming one or more of the problems discussed above.

BRIEF SUMMARY OF THE INVENTION

In one aspect the present invention provides a stroke adjuster attachment for a device which is operated by manual turning of a pair of foot pedals about an axis of rotation wherein the pedals are attached to crank arms which extend in opposite radial directions relative to the axis of rotation and wherein each crank arm has a pedal engaging opening at a distal end of the arm for enabling fastening of a foot pedal to the crank arm. Components of the attachment include a linear track member having an inner face positioned to extend along a crank arm and having an opposite outer face and having a fastener receiving passage positioned to align with the pedal engaging opening of the crank arm. A slot extends along the outer face of the track member and detent seating openings are spaced apart along the slot. The attachment further includes a threaded fastener for insertion into the fastener receiving passage of the track member and for engagement in the opening of the crank arm to secure the attachment to the crank arm. A slider member which is engaged by the track member is movable along the slot and has a threaded passage for enabling fastening of a foot pedal to the slider member. A releasable detent is carried by the slider member for engaging any selected one of the detent seating passages to hold the slider member at a selected location along the track member. A pair of spaced apart blades extends outward from the inner face of the track member for a distance sufficient to enable retention of a portion of the crank arm between the blades thereby preventing pivoting movement of the track member relative to the crank arm.

In another aspect of the invention, a pedal stroke adjuster is attachable to a device that is operated by manual turning of a pair of foot pedals about an axis of rotation and which is of the type wherein the pedals are fastened to crank arms which extend in opposite radial directions relative to the axis of rotation and wherein each crank arm has a proximal end situated at said axis of rotation and has distal end with a pedal engaging opening thereat for enabling fastening of a foot pedal to the crank arm. The stroke adjuster includes a linear track member having an inner face positioned to extend along a crank arm and having an opposite outer face and having a fastener receiving passage positioned to align with the pedal engaging opening of the crank arm. A slot extends along the outer face of the track member and a plurality of detent seating openings are spaced apart along the slot. The track member has a pair of spaced apart parallel blades which extend outward from the inner face of the member for a distance sufficient to block pivoting movement of the track member relative to the crank arm. The blades are at a location which is away from the proximal end and the distal end of the crank arm when the track member is installed thereon. Further components include a threaded fastener for insertion into the fastener receiving passage of the track member and into the pedal engaging opening of the crank arm to secure said attachment to said crank arm. A slider member is engaged by the track member and is movable along slot of the track member. The slider has a threaded passage enabling fastening of a foot pedal to the slider member. A releasable detent on the slider member may be engaged at any selected one of the detent seating openings to hold the slider member and pedal at a selected location along the track member.

The invention provides a pedal stroke adjuster which enables changing of the diameter of the orbit that is traveled by one or both foot pedals of a particular bicycle in order to accommodate to the needs of different persons. The, adjuster has a configuration which is compatible with any of a variety of different bicycle crank arms having different sizes and shapes. It is not necessary to vary the design of the attachment in order to accommodate to differing crank arms. This provides for more widespread use of pedal stroke adjusters by simplifying the manufacture and distribution of such devices.

The invention, together with further objects and advantages thereof, may be further understood by reference to the following detailed description of the invention and by reference to the accompanying drawings.

DETAILED DESCRIPTION OF THE INVENTION

For purposes of example the invention will herein be described as applied to a bicycle. It should be recognized that the invention is also applicable to other devices which are operated by manual revolving of foot pedals such as certain stationary exercising machines for example.

Figure 1:
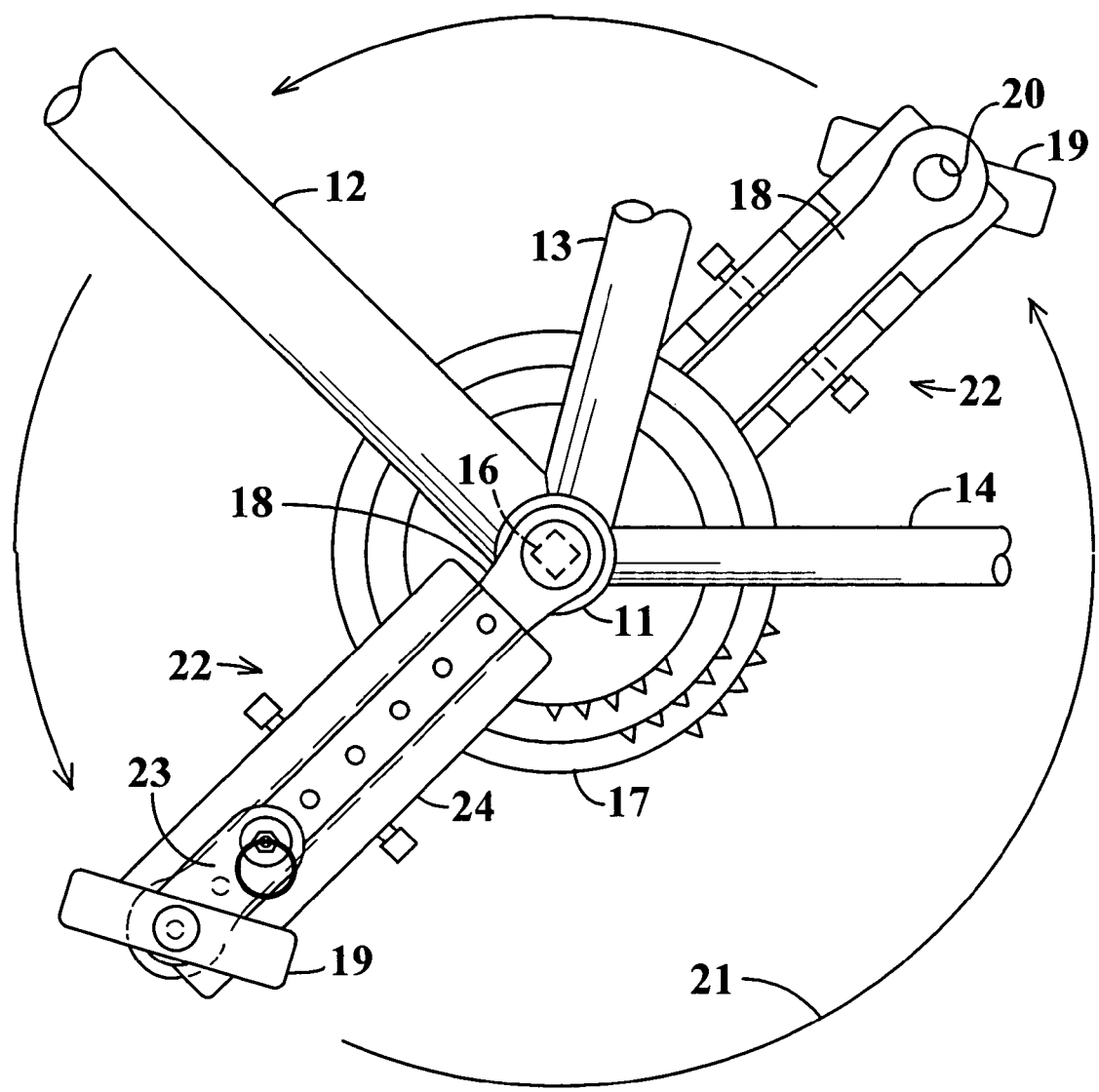
FIG. 1 is a side elevation view of a portion of a bicycle that includes the drive sprocket gear, the crank arms and the foot pedals and which further includes pedal stroke adjuster attachments embodying the invention, the apparatus being depicted as viewed from the left hand side of the bicycle.

Referring initially to FIG. 1 of the drawings, components of a bicycle include a hub 11 from which frame members 12, 13 and 14 extend to connect to other components that are not depicted in the drawing as the bicycle itself may be of conventional construction. The hub 11 functions as a bearing for the axle 16 of a sprocket gear assembly 17 which turns a wheel of the bicycle by means of a drive chain which components are also not shown as they may be of any of the known constructions. Axle 16 and sprocket gear assembly 17 are turned by two crank arms 18 which extend in opposite radial directions relative to the axis of rotation of the axle and which are at opposite sides of the bicycle. Swiveling foot pedals 19 which are carried by the crank arms 18 are traveled around a circular orbit 21 by operator foot pressure which orbit is centered on the axis of rotation of axle 16 and sprocket gear assembly 17.

In the standard bicycle, the foot pedals 19 are fastened directly to the distal ends of crank arms 18 at pedal engaging threaded openings 20 in the crank arm. Consequently, the foot pedal orbit 21 is of fixed diameter and is not adjustable to accommodate to persons of different size or to persons which may have foot movement impediments.

The present invention provides a pedal stroke adjuster 22 attachment which enables selective changing of the diameter of the orbit 21 of a foot pedal 19. During installation of the pedal stroke adjuster 22, the foot pedal 19 is detached from the crank arm 18 and is reattached to a slider member 23 of the stroke adjuster. As will hereinafter be described in more detail, slider member 23 may be traveled to any selected one of a series of locations along the stroke adjuster 22 and crank arm 18. This enables selective changing of the diameter of the foot pedal orbit 21 to accommodate to the needs of particular persons. Stroke adjusters 22 may be attached to both crank arms 18 as in this example or a single stroke adjuster may be provided at just one of the crank arms in instances where the operator has an impediment which limits movement of only one foot.

Figure 3:
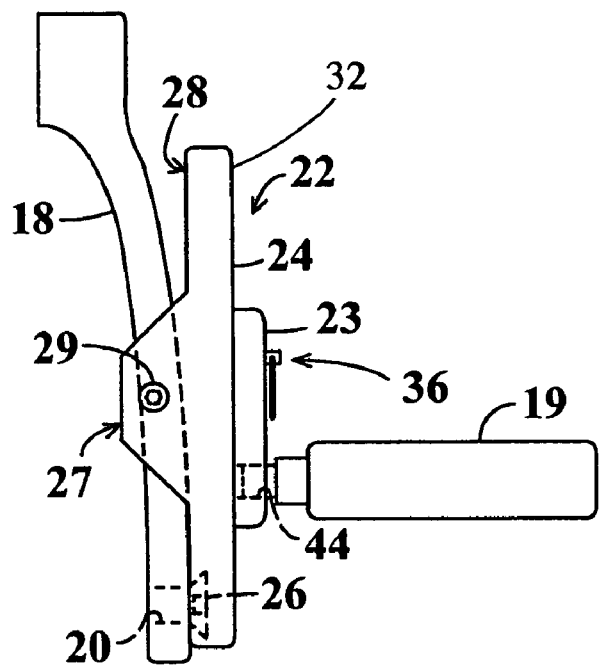
FIG. 3 is an elevation view of the apparatus of FIG. 2 taken at right angles to the plane of FIG. 2.
Figure 2:
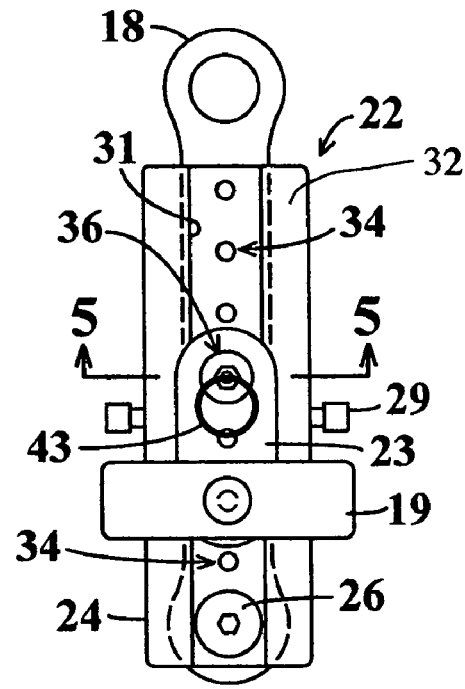
FIG. 2 is an elevation view of the crank arm and the associated pedal stroke adjuster attachment which are at the left hand side of the bicycle of FIG. 1 wherein the attachment has been adjusted to establish a shorter pedal stroke
Figure 4:
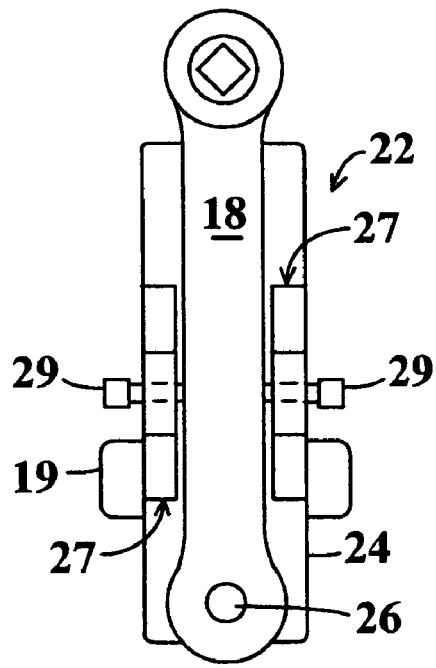
FIG. 4 is an elevation view of the apparatus of FIG. 2 viewed from the opposite side of the apparatus.

Referring jointly to FIGS. 2, 3 and 4, the pedal stroke adjuster 22 has a linear track member 24 which is attached to the crank arm 18 and which is proportioned to extend along the crank arm towards the axis of rotation of the crank arm. A threaded fastener 26 engages in the pedal engaging opening 20 of the crank arm 18 to fasten the stroke adjuster 22 to the distal end of the crank arm. Spaced apart parallel blades 27, which may be integral portions of track member 24, extend outward from the inner face 28 of the track member to locations which are at opposite sides of the crank arm 18. This assures that the track member 24 cannot pivot relative to the crank arm 18 about the axis of fastener 26. The fastening of the track member 24 to crank arm 18 is further strengthened by a pair of set screws 29 which are collinear and which engage in the blades 27. Thus, as best seen in FIG. 4, set screws 29 may be tightened to bear against opposite surfaces of crank arm 18 and thereby tightly clamp the track member 24 to the crank arm.

Referring again to FIGS. 2, 3 and 4 in conjunction, this mode of fastening the pedal stroke adjuster 22 to crank arm 18 tolerates much variation in the size and shape of the crank arm. It is not necessary that the adjuster 22 lie flat against the crank arm throughout is length. Contact between the track member 24 and crank arm 18 is needed only at the distal end of the crank arm where fastener 26 is located and at an intermediate location along the arm where set screws 29 are located. Portions of the crank arm 18 which are closer to the axis of rotation of the arm may have any of various different curvatures without interfering with emplacement of the pedal stroke adjuster 22. The adjuster 22 is attachable to crank arms 18 of different lengths and thickness.

Figure 5:
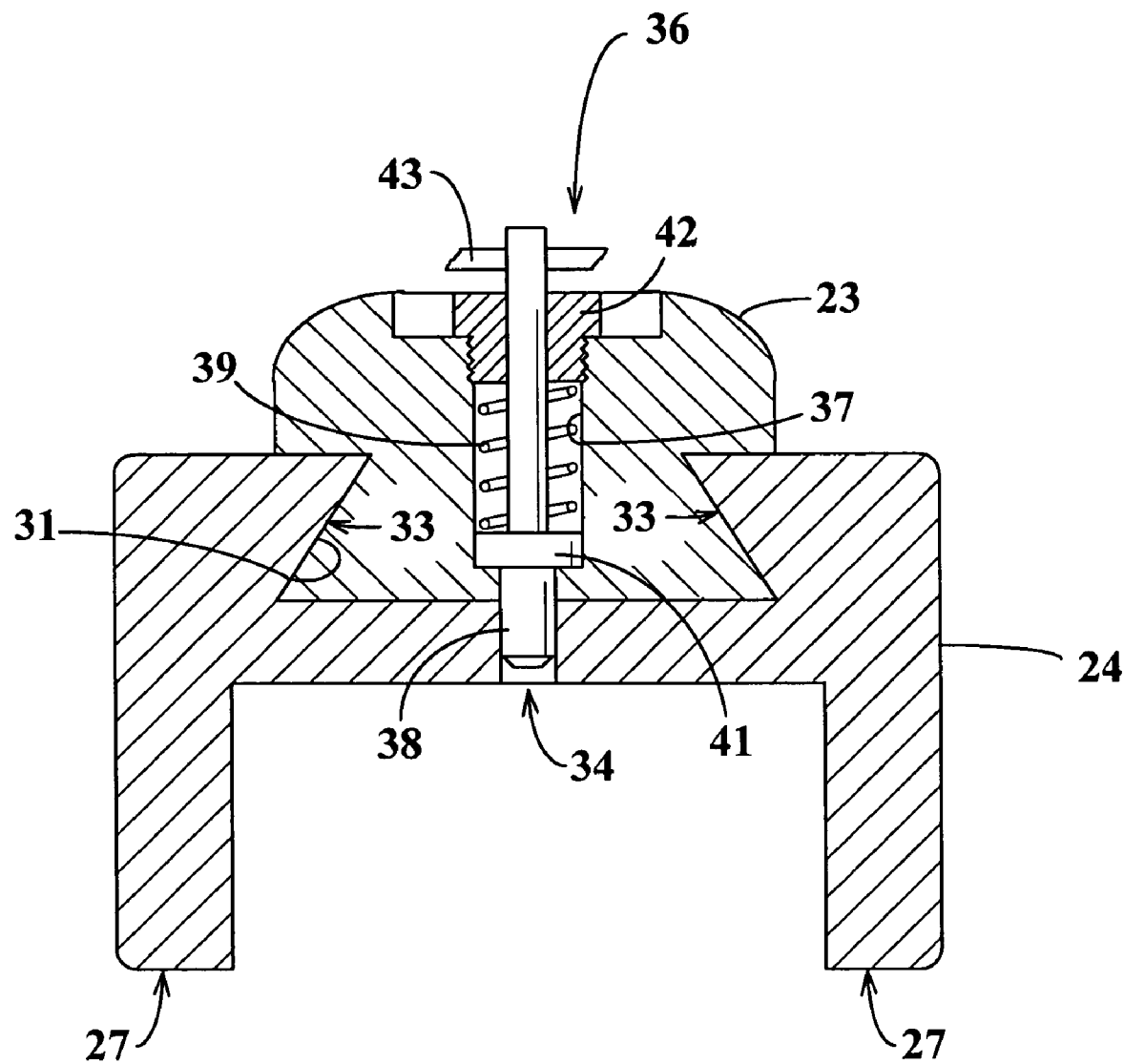
FIG. 5 is a cross section view taken along line 5—5 of FIG. 2.

Referring jointly to FIGS. 2, 3 and 5, slider member 23 travels along a linear slot 31 which is open at the outer face 32 of track member 24 and which extends the full length of the track member. The sidewalls 33 of slot 31 are convergent towards the outer face 32 and the portion of slider member 23 which is within the slot has a similar convergent cross section. Thus the slider member 23 can only be withdrawn from slot 31 by traveling the slider member out of an end of the slot. Selection of a pedal orbit diameter is provided for by a series of detent seating openings 34 in the track member 24 which are spaced apart along the length of slot 31 at the base of the slot. A releasable detent 36 provides for latching of the slider member 23 at any selected one of the detent seating openings 34.

The detent 36 of this example is situated in a stepped bore 37 in slider member 23 which is oriented at right angles to the direction of travel of the slider member. A detent pin 38 extends along the axis of bore 37 and has an inner end 38 proportioned to enter into any selected one of the detent seating openings 34 to hold the slider member 23 at that location along track member 24. A compression spring 39 in bore 37 acts against a flange 41 on pin 38 to urge the pin in the direction of the detent seating opening 34. Spring 39 is retained in place by a threaded annular cap 42 situated at the outer end of bore 37. Pin 38 extends through cap 42. A ring 43 at the protruding end of the pin 38 facilitates manual retraction of the pin from detent seating opening 34 when the slider member 23 is to be moved to a new location along track member 24.

Referring again to FIGS. 2 and 3, the slider member 23 has a threaded opening 44 similar to the opening 20 at the distal end of a crank arm. This enables fastening of the foot pedal 19 to the slider member 23 and thus the pedal can be positioned at any of various locations along crank arm 18 to change the orbit of the foot pedal as previously described.

Figure 6:
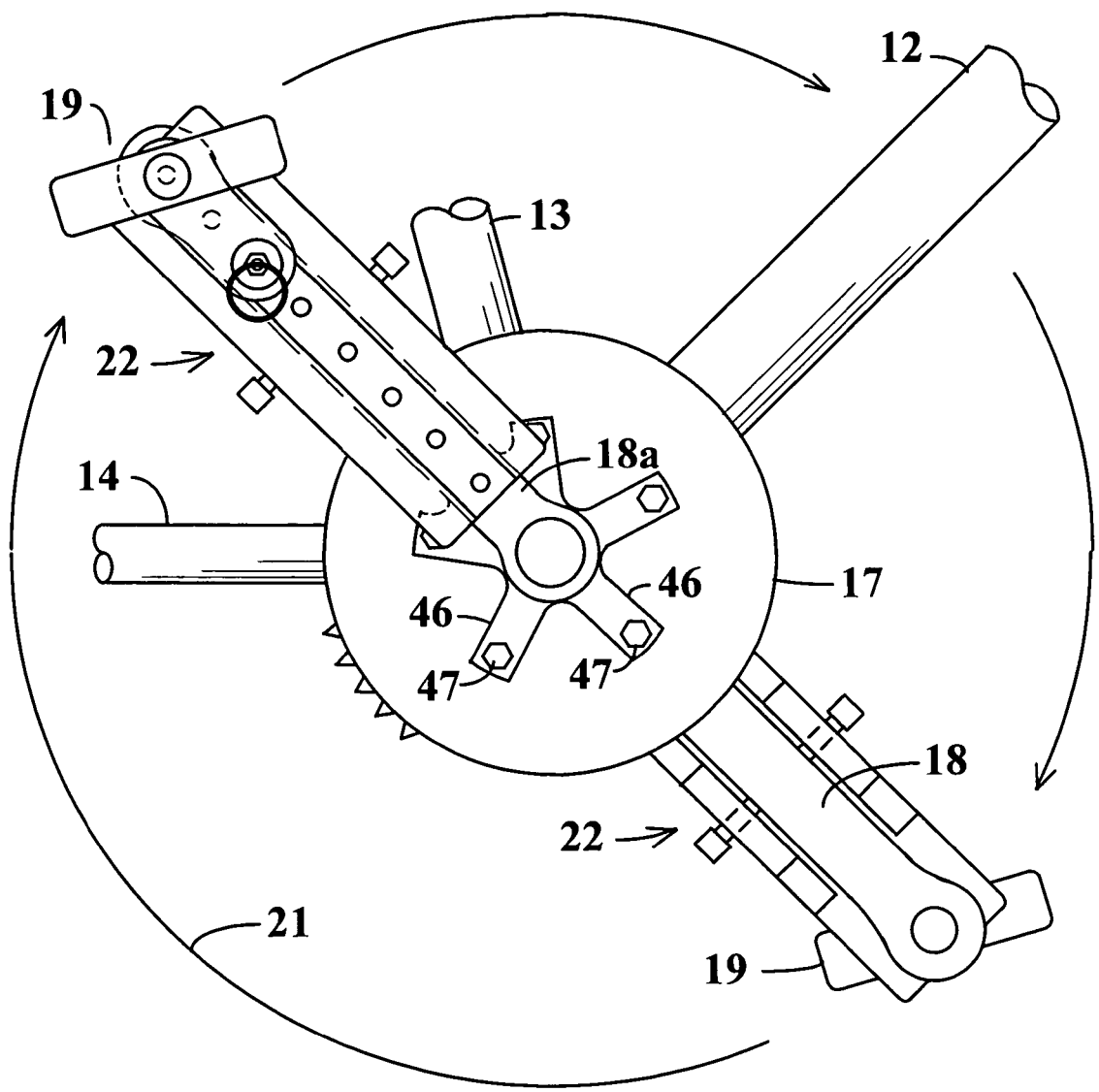
FIG. 6 is a side elevation view of the apparatus of FIG. 1 as viewed from the opposite side of the bicycle.

Referring to FIG. 6, the sprocket gear assembly 17 of a bicycle is located at one side of the bicycle. In some bicycles, the crank arm 18a at that side of the bicycle differs from the crank arm 18 at the opposite side. In particular, crank arm 18b may be of the splined type which has arms 46 at the proximal end of the crank arm that extend radially relative to the axis of rotation of sprocket gear assembly 17 at angular intervals around the axis. Arms 46 enable direct fastening of the crank arm 18a to sprocket gear assembly 17, by bolts 47, at a plurality of spaced apart locations thereby providing a very high strength connection between these components. The pedal stroke adjuster 22 as hereinbefore described is fully compatible with splined crank arms 18b of this type as it fastens to the crank arm at locations which are away from proximal end of the crank arm and does not require that surfaces at the proximal end of the arm have any specific configuration.

While the invention has been described with reference to a particular embodiment for purposes of example, many variations and modifications of the pedal stroke adjuster are possible and it is not intended to limit the scope of the invention except as defined by the following claims.

What is claimed is:

1. A pedal stroke adjuster attachment for a device which is operated by manual turning of a pair of foot pedals about an axis of rotation wherein the pedals are attached to crank arms which extend in opposite radial directions relative to the axis of rotation and wherein each crank arm has a pedal engaging opening at a distal end of the arm for enabling fastening of a foot pedal to the crank arm, said stroke adjuster attachment comprising:
   a linear track member having an inner face positioned to extend along a crank arm and having an opposite outer face and having a fastener receiving passage to align with said pedal engaging opening of the crank arm, the track member further having a slot extending along said outer face thereof and having a plurality of detent seating openings which are spaced apart along said slot,
   a threaded fastener for insertion into said fastener receiving passage of said track member and for engagement in said opening of the crank arm to secure said attachment to said crank arm;
   a slider member engaged by the track member and which is movable along said slot and having a threaded passage for enabling fastening of a foot pedal to the slider member;
   a releasable detent carried by said slider member for engaging any selected one of said detent seating passages to hold said slider member at a selected location along said track member;
   the track member further having a pair of spaced apart parallel blades which extend outwardly from said inner face thereof and define therebetween a region configured to retain a portion of the crank arm, thereby preventing pivoting movement of said track member relative to said crank arm;
   wherein said fastener receiving passage is at a distal end of said track member, said blades are at a location which is spaced away from said distal end of the track member and the blades have parallel flat surfaces that face each other at opposite sides of an open region, and means extending from said flat surfaces for clamping said crank arm at a centered location in said region.

2. The pedal stroke adjuster attachment of claim 1 wherein the clamping means include a pair of adjustable set screws extending from said blades into said region between said blades in position to contact opposite surfaces of a crank arm which extends along said region.

3. The pedal stroke adjuster attachment of claim 2 wherein said set screws are aligned with each other and are oriented at right angles to said blades.

4. The pedal stroke adjuster attachment of claim 3 wherein said set screws are spaced outward from said inner face of said track member.

5. The pedal stroke adjuster attachment of claim 1 wherein said blades extend from said track member at a location which is intermediate between ends of the track member.

6. The pedal stroke adjuster attachment of claim 1 wherein said track member is configured to contact a crank arm only at said fastener receiving passage and at said region between said blades.

7. A pedal stroke adjuster attachment for a device which is operated by manual turning of a pair of foot pedals about an axis of rotation wherein the pedals are attached to crank arms which extend in opposite radial directions relative to the axis of rotation and wherein each crank arm has a proximal end situated at said axis of rotation and has a distal end with a pedal engaging opening thereat for enabling fastening of a foot pedal to the crank arm, said stroke adjuster attachment comprising:
   a linear track member having an inner face positioned to extend along a crank arm and having an opposite outer face and having a fastener receiving passage positioned to align with said pedal engaging opening of the crank arm, the track member further having a slot extending along said outer face thereof and having a plurality of detent seating openings which are spaced apart along said slot, said track member further having a pair of spaced apart blades, having parallel flat surfaces that face each other at opposite sides of an open region, parallel blades which extend outward from said inner face thereof to straddle the crank arm and block pivoting movement of said track member relative to the crank arm and which extend at a location which is away from said proximal end and said distal end of the crank arm when said track member is installed thereon;
   a threaded fastener for insertion into said fastener receiving passage of said track member and into said pedal engaging opening of the crank arm to secure said attachment to said crank arm;
   a slider member engaged by the track member and which is movable along said slot and having a threaded passage for enabling fastening of a foot pedal to the slider member;
   a releasable detent on said slider member for engaging any selected one of said detent seating openings to hold said slider member at a selected location along said track member; and
   a pair of set screws each extending from a separate one of said blades into a region between said blades in position to contact opposite locations on a crank arm which extends along said region, said set screws being aligned with each other and being spaced outward from said inner surfaces of said track member.

* * * * *